(12) United States Patent
Lüde

(10) Patent No.: US 6,592,108 B1
(45) Date of Patent: Jul. 15, 2003

(54) SUSPENSION DEVICE

(75) Inventor: Dirk Lüde, Bretten (DE)

(73) Assignee: Marc Schmidt-Thieme, Mannheim (DE)

( * ) Notice: Subject to any disclaimer, the term of this patent is extended or adjusted under 35 U.S.C. 154(b) by 0 days.

(21) Appl. No.: 10/198,284

(22) Filed: Jul. 18, 2002

(51) Int. Cl.$^7$ .................................. F61F 9/43
(52) U.S. Cl. .................................... 267/64.28
(58) Field of Search .......................... 267/64.11, 64.28, 267/DIG. 1, DIG. 2; 188/321.21

(56) References Cited

U.S. PATENT DOCUMENTS

| | | | | |
|---|---|---|---|---|
| 2,827,229 A | * | 3/1958 | Cosentino ..................... | 494/16 |
| 2,902,288 A | * | 9/1959 | Dill ............................ | 280/43.23 |
| 3,275,314 A | * | 9/1966 | Ostwald ..................... | 267/64.28 |
| 4,597,548 A | * | 7/1986 | Bergloff et al. ......... | 244/104 FP |
| 5,417,446 A | * | 5/1995 | Pileggi ....................... | 280/276 |
| 5,988,607 A | * | 11/1999 | Beck ........................ | 267/64.26 |
| 6,129,368 A | * | 10/2000 | Ishikawa .............. | 280/124.112 |
| 2002/0121731 A1 | * | 9/2002 | Miller et al. ............. | 267/64.28 |

FOREIGN PATENT DOCUMENTS

| | | |
|---|---|---|
| DE | 463391 | 8/1928 |
| DE | 1143398 | 8/1963 |
| DE | 19740143 A1 | 4/1999 |
| DE | 19953901 | 7/2001 |
| WO | WO 9903721 | 1/1999 |

* cited by examiner

*Primary Examiner*—Christopher P. Schwartz
*Assistant Examiner*—Devon Kramer
(74) *Attorney, Agent, or Firm*—Volpe and Koenig P.C.

(57) ABSTRACT

A suspension device (1) that has at least one reciprocating cylinder device (2) including a piston (4) located in the inner cavity of the cylinder (3) and which can move along the axis. The cylinder (3) is closed on its opposing ends facing by end walls (5a, 5b). The piston (4) is connected to a piston rod (6) which penetrates one of the end walls (5a). On both sides of the piston (4), there are working spaces (8a, 8b) formed by the surrounding piston (4) and the end walls (5a, 5b) which are filled with a working gas and are sealed airtight when in use. A filling device is provided for filling the working spaces (8a, 8b) with the working gas and includes a common feed line (9) for filling both of the working spaces (8a, 8b). A first shut-off device (12) is located in the common feed line (9), and the working spaces (8a, 8b) located on both sides of the piston (4) are connected to each other by a connecting line (13) that is openable and closeable by a second shut-off device (14) that is operable from outside of the device.

9 Claims, 4 Drawing Sheets

SUSPENSION DEVICE

BACKGROUND

The invention is directed to a suspension device, in particular for a bicycle, with at least one reciprocating cylinder device featuring an axial supported sliding piston in the inner cavity of the cylinder. The cylinder is closed at the opposing ends by end walls, and the piston is connected to a piston rod which pushes against one of the end walls. Both sides of the piston are surrounded by the working space bordering the piston and the end walls, and which is filled with a working gas and is sealed airtight in operation. A filling device is provided for filling the working space with the working gas.

A suspension device of this type is known from WO 99/03721. It features working spaces on both sides of the piston which are separated from each other by the piston, limited by the cylinder and one of the end walls, and filled with a working gas; and it is sealed airtight when in operation. The piston is situated between the two end walls at a distance from both when at rest. The piston can be moved from its resting position by a reset force caused by the axial sliding within the cylinder against the volume of gas encased in the working spaces.

In doing so, the working gas is compressed inside one of the working spaces and decompressed in the other working space, so that the volume of gas found in the different working spaces exerts a pushing or pulling force on the piston, each corresponding to the product of the gas pressure of the gas found in the working space and the piston surface impinged on by this gas pressure. Since the force exerted on both sides of the piston is mutually compensating when the piston is in its resting position, only a comparatively small deflection force needs to be exerted on the piston to move it from its resting position. Thus, compared to a suspension device with only one working space situated on one of the two sides of the piston, this results in a better response from the suspension device, and therefore a more comfortable suspension. Furthermore, a progressive spring characteristic results from the two working spaces found on both sides of the piston, i.e. the increase in the spring characteristic increases with increasing deflection of the piston from its resting position. In this way, an abutting of the piston against one of the end walls, and therefore an undesirably strong deflection of the piston from its resting position is largely avoided.

A filling device is provided for filling both working spaces with working gas and features a feed opening for each space on the outside of the suspension device. These feed openings are connected to the corresponding working space by a feed line. There is a valve installed in each feed line which prevents the escape of the working gas from the working space. The filling of the working space can take place, for example, by means of high air pressure, which is alternately connected to both feed openings of the working spaces. The filling of the suspension device with the working gas through the working spaces on both sides of the piston is relatively complicated in comparison to a suspension device with only one working space. So it is especially difficult for a layperson who is not thoroughly familiar with the operation of the filling device to for the optimal balance for the suspension through appropriate filling of the different working spaces when dealing with such a suspension device installed on a bicycle.

SUMMARY

The object exists, therefore, of creating a suspension device of the type mentioned in the introduction which makes it possible to adjust the suspension device simply through a simple method of filling the working spaces with the working gas.

The solution to this problem is found in a suspension device like that mentioned in the introduction which is provided with a filling device featuring a common feed line for filling both working spaces with the working gas, in which a first shut-off device is situated. In this device, the working spaces situated on both sides of the piston are connected to each other by a connecting line in which a second shut-off device is located and which can be operated from outside.

As an advantage, both working spaces can also be filled with the working gas at the same time, which makes a simple management of the suspension device possible. The filling of the working spaces can take place, for example, by first opening the second shut-off device located in the connecting line, and then connecting the feed line to a source of gas pressure or a pump. Next, the first shut-off device located in the feed line is opened, and both working spaces are filled at the same time through the feed line. After or during the filling of the working spaces with working gas, the piston is positioned in the desired position in the cylinder and, with the piston in this position, the second shut-off device is closed, so that both working spaces are then sealed airtight from each other. If needed, the source of gas pressure or the pump can then be separated from the feed line. Of course, the working gas can also be put into only one of the working spaces first by closing the second shut-off device located in the connecting line. After filling this working space with the working gas, the first shut-off device located in the feed line is closed. Then the second shut-off device located in the connecting line is opened so that the working gas can then flow from one working space into the other. As an advantage, the resting position of the piston within the inner cavity of the cylinder can be changed in a simple manner when the second shut-off device located in the connecting line is open, without needing to fill the inner cavity of the cylinder with more working gas or allowing it to escape. The first shut-off device located in the feed line is preferably a valve operated by the pressure of the working gas.

It is advantageous if the connecting line between the working spaces penetrates the piston and if the shut-off device located in the connecting line is connected with an operating device which penetrates an inner cavity of the piston rod and is located on the outer end of the piston rod. This results in an especially compactly constructed suspension device, in which the transfer element is situated so on the inside of the hollow piston rod, as to save space. Therefore, the operating device is located on the free end of the piston rod facing away from the piston, where it is easily accessible for opening and closing the second shutoff device located in the connecting line.

A yet more compact suspension device can be achieved by constructing it so that the working gas feed line penetrates an inner cavity of the transfer element. On the outer end of the transfer element facing away from the piston, a feed/escape opening for the working gas can then be provided in the vicinity of the operating device, for example, which is connected by the feed line with a feed line opening leading to one of the working spaces located on the other end of the transfer element.

In a prototype of the invention, the inner cavity of the piston rod penetrates the piston and forms the continuation of the feed line by connecting to the inner cavity of the transfer element. The feed line constructed to penetrate the inner cavity of the transfer element can then be connected simply for filling with or discharging of the working gas through the inner cavity of the piston rod penetrating the piston with the working space located on the side of the piston facing away from the operating device of the second shut-off device located in the connecting line.

In a preferred embodiment of the invention, the hollow piston rod, which is connected to one of the working spaces by its inner cavity, features an opening on the side for the working gas leading to the other working space. A slide valve for closing and opening this opening is provided on the inner end of the transfer device. The second shut-off device located in the connecting line and formed by the opening on the side and the slide valve is then located in the inside of the piston rod, thus achieving an especially compact construction.

The slide valve is conveniently constructed as a sealing piston feeding into the piston rod, which can be moved into a closed position covering the opening on the side and into an open position when pulled out. The slide valve then feeds especially well into the inner cavity of the piston rod, which makes possible a good, airtight seal of both the working spaces located on either side of the piston. The slide valve constructed as a piston can, if need be, feature sealing rings opposite each other around its circumference in the axial direction. In the closed position, these sealing rings are located on the slide valve on both sides of the opening.

It is especially advantageous if the cylinder is cup-shaped and constructed with the cylinder housing in one piece with one of the end walls. On the opposite end wall, a seal can be provided which seals the piston rod against this end wall.

In an especially advantageous embodiment of the invention, the suspension device is constructed as a bicycle fork whose fork legs each feature telescope-like telescoping parts nestled within each other and which can be moved in relation to each other in the extension direction of the fork legs. These telescoping parts each define an inner cavity in which the reciprocating cylinder device of the invention is located. The cylinder of the reciprocating cylinder device is connected with one telescoping part and the piston rod with the other telescoping part. The suspension device then makes a comfortable air suspension of the bicycle frame possible with regard to the steering wheel of the bicycle situated between the free ends of the bicycle fork. Thus, this kind of suspension device can be located in particular on the front steering wheel of a bicycle.

The piston rod is conveniently connected with each upper telescoping part of the fork leg of the bicycle fork when in use, and the operating device, if needed, and a feed opening for the feed line is located on the upper end of the fork leg. The operating device and the feed opening for the feed line are then easily accessed on the upper end of the bicycle fork for filling the working spaces with working gas and/or for altering the resting position of the piston, which is situated so that it can be moved within the cylinder. If needed, the first shut-off device, located inside the connecting line and preferably constructed as a valve, can be situated in the vicinity of the feed opening.

BRIEF DESCRIPTION OF THE DRAWINGS

In the following, a preferred embodiment of the invention is explained in more detail on the basis of the attached drawings. In the drawings.

DETAILED DESCRIPTION OF THE PREFERRED EMBODIMENT

Figure 3:
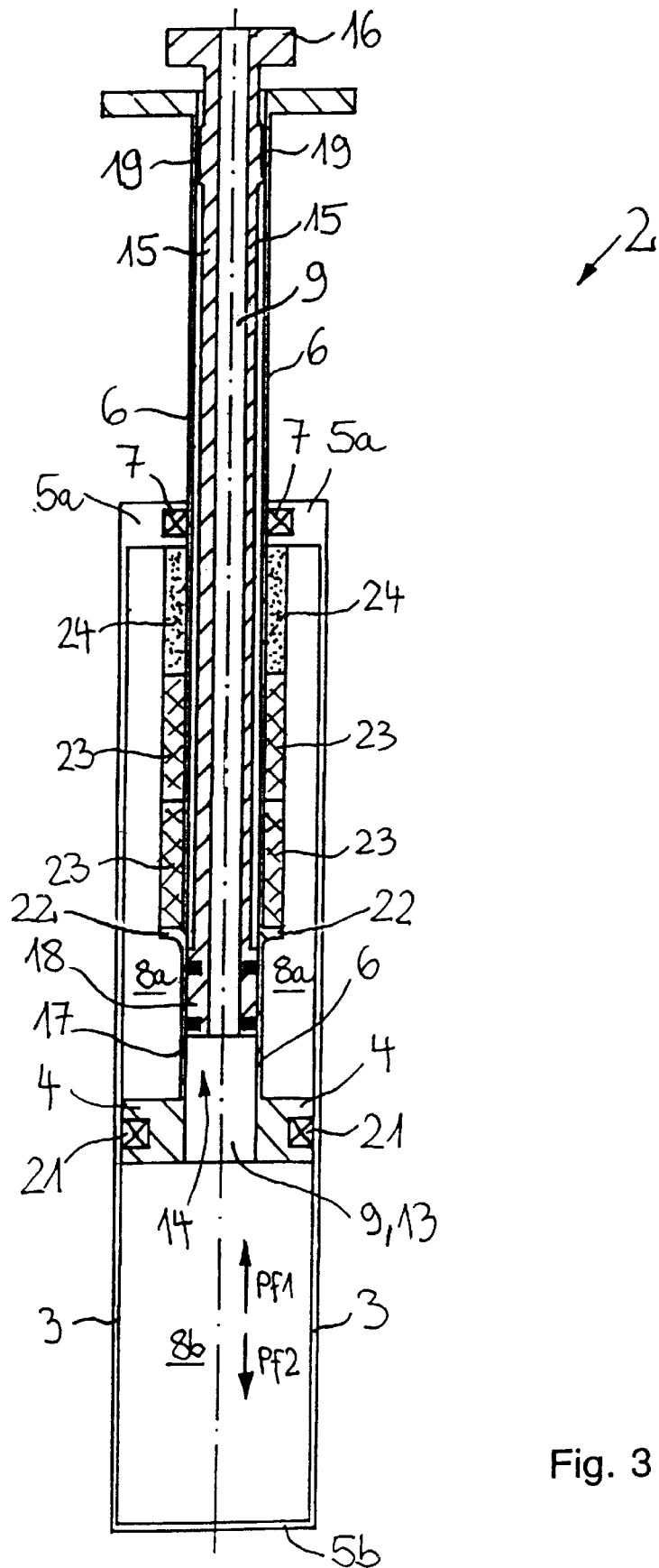
FIG. 3 is an enlarged view of the reciprocating cylinder device recognizable in FIG. 2, located in the inner cavity located in the telescoping parts.
Figure 4:
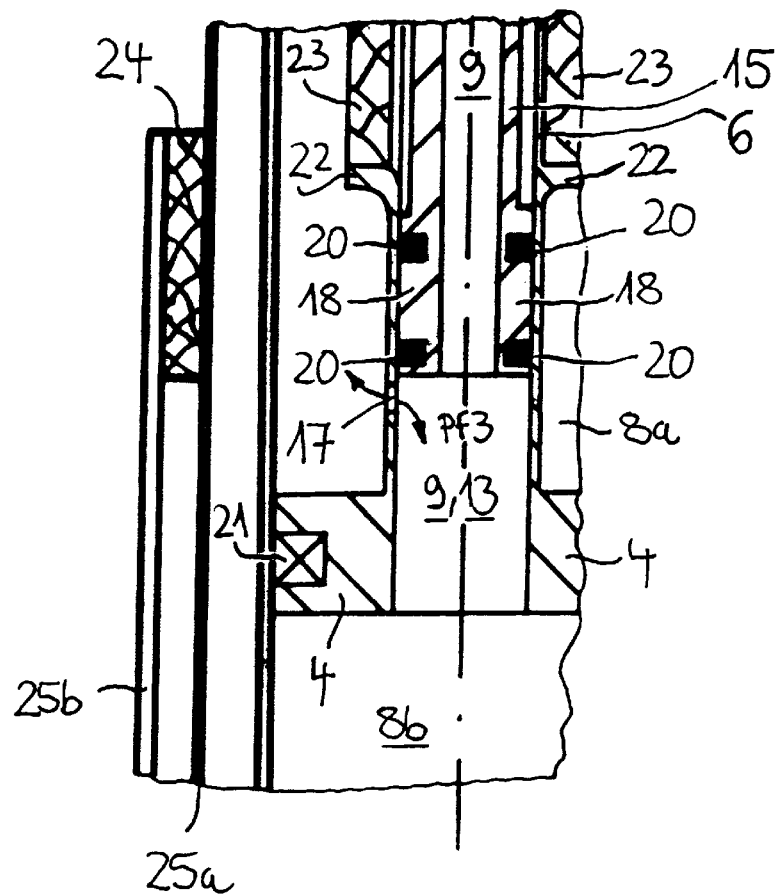
FIG. 4 is an enlarged partial representation of the reciprocating cylinder device illustrated in FIG. 3 in which the opening located in the wall of the hollow piston rod can be seen especially well.

A suspension device constructed as a bicycle fork, completely in keeping with 1, features two reciprocating cylinder devices 2, which have a piston 4 that can move along the axis situated in the inner cavity of the cylinder 3. In FIG. 3, it can be seen that the cylinder 3 is sealed airtight on its opposite ends by end walls 5a, 5b. The piston 4 is connected to the one end of a piston rod 6, which penetrates an opening in the wall provided for it in the end wall 5a, with its other end protruding on the outside of the end wall 5a. The piston rod 6 is situated so that it moves axially by means of a slide bearing in the direction of arrows Pf1, Pf2 opposite the casing parts formed from the end walls 5a, 5b and the cylinder 4. The end wall 5a features a ring groove-shaped receptacle on its wall area surrounding the opening in the wall for the piston rod 6, facing the piston rod 6, in which a sealing ring 7 is placed which seals the end wall 5a airtight against the piston rod 6.

In the extension direction of the cylinder 3, a working space 8a, 8b is formed on both sides of the piston 4. This working space is defined by the piston 4, one of the end walls 5a, 5b and on the side by the cylinder 3. When the reciprocating cylinder device 2 is operating, the working spaces 8a, 8b are sealed airtight and filled with a working gas which creates an air suspension.

Figure 5:
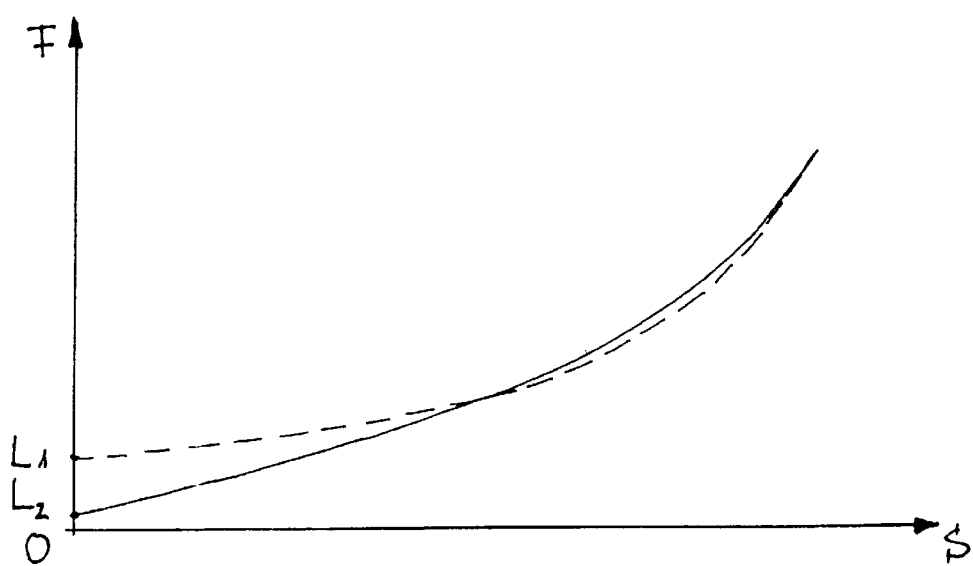
FIG. 5 is a graph of the characteristic force-path curve of the invention's reciprocating cylinder device, in which the path is shown on the abscissa and the force on the ordinate. For the sake of comparison, the characteristic force-path curve of a conventional air suspension with only one working space is also shown.

The working gas in the working space 8a penetrated by the piston rod 6 exerts a pressure force on the piston 4 in the direction of the arrow Pf2, which corresponds to the product of the air pressure in the working space 8a and the annulus area formed by projection of the surface of the piston located between the piston rod 6 and the cylinder 3 in the direction of the arrow Pf2 and impinged on by the working gas. The working gas found in the working space 8b located on the other side of the piston exerts a force on the piston 4 against the direction of the arrow Pf2, which corresponds to the product of the gas pressure in the working space 8b and the cross-section area of the working space 8b in a plane running perpendicular to the direction of movement of the piston 4 indicated by arrows Pf1, Pf2. The force of pressure exerted on the piston 4 by the working gases located in the working spaces 8a, 8b compensate for each other at least partially. As can be seen from the suspension curve in FIG. 5, the piston 4, when in the resting position indicated by zero on the abscissa, allows itself to be moved easily from its resting position relative to the cylinder 3 by means of a pressure or force component L2 exerted between the piston and the cylinder in the direction of arrows Pf1, Pf2. The suspension device 1 thus features only a comparatively small breakaway moment and therefore makes the shock absorption of smaller shock impulses possible. For the sake of comparison, in FIG. 5 a suspension curve is shown, depicted as a dotted line, for a suspension device featuring only one working space impinged on by gas pressure on only one side of the piston. It can be clearly seen that the force L2 necessary for moving the piston from its resting position in this suspension device is approximately four times as great as that needed for the suspension device 1 of this invention.

Because of the gas-filled working spaces 8a, 8b on both sides of the piston 4, there is a resulting progressive suspension curve during a movement of the piston 4 from its resting position in both directions, directed against each other and indicated by the arrows Pf1, Pf2, which largely prevents the abutting of the piston 4 against one of the end walls 5a, 5b even when absorbing severe shocks. The displacement of the bicycle fork can be well utilized in this manner.

A filling device is provided for filling the working spaces 8a, 8b with the working gas which features a common feed line 9 for filling both working spaces 8a, 8b. The feed line 9 connects the working spaces 8a, 8b with a working gas feed opening 11 located on the upper end of the fork legs 10 of the bicycle fork. When the reciprocating cylinder device 2 is in use, the feed line 9 is sealed by means of a first shut-off device 12 constructed as a valve. The shut-off device 12 is operable by pressure from the working gas and opens as long as gas pressure is applied to the feed opening 12 which is greater than the gas pressure in the working space 8b.

The working spaces 8a, 8b located on both sides of the piston 4 are connected to each other by a connecting line 13, in which a second shut-off device 14 is located which can also be operated from outside. As can be easily seen in FIG. 3, the second shut-off device 14 is connected to an operating device 16 located on the outside of the end of the piston rod 6 facing away from the piston 4 by a transfer device 15 penetrating the inner cavity of the piston rod 6. By means of the operating device 16, the connecting line 13 can be opened in order to connect the two working spaces 8a, 8b and be closed in order to separate the working spaces 8a, 8b. When the connecting line 13 which connects the working spaces 8a, 8b with each other is open, the piston 4 can be moved from its resting position in the cylinder 3 very easily, the working gas from one working space 8a, 8b flowing through the connecting line 13 into the other working space 8a, 8b. The suspension device 1 is thus easily managed since it is easy even for a layman to quickly determine the optimal balance for suspension.

Figure 1:
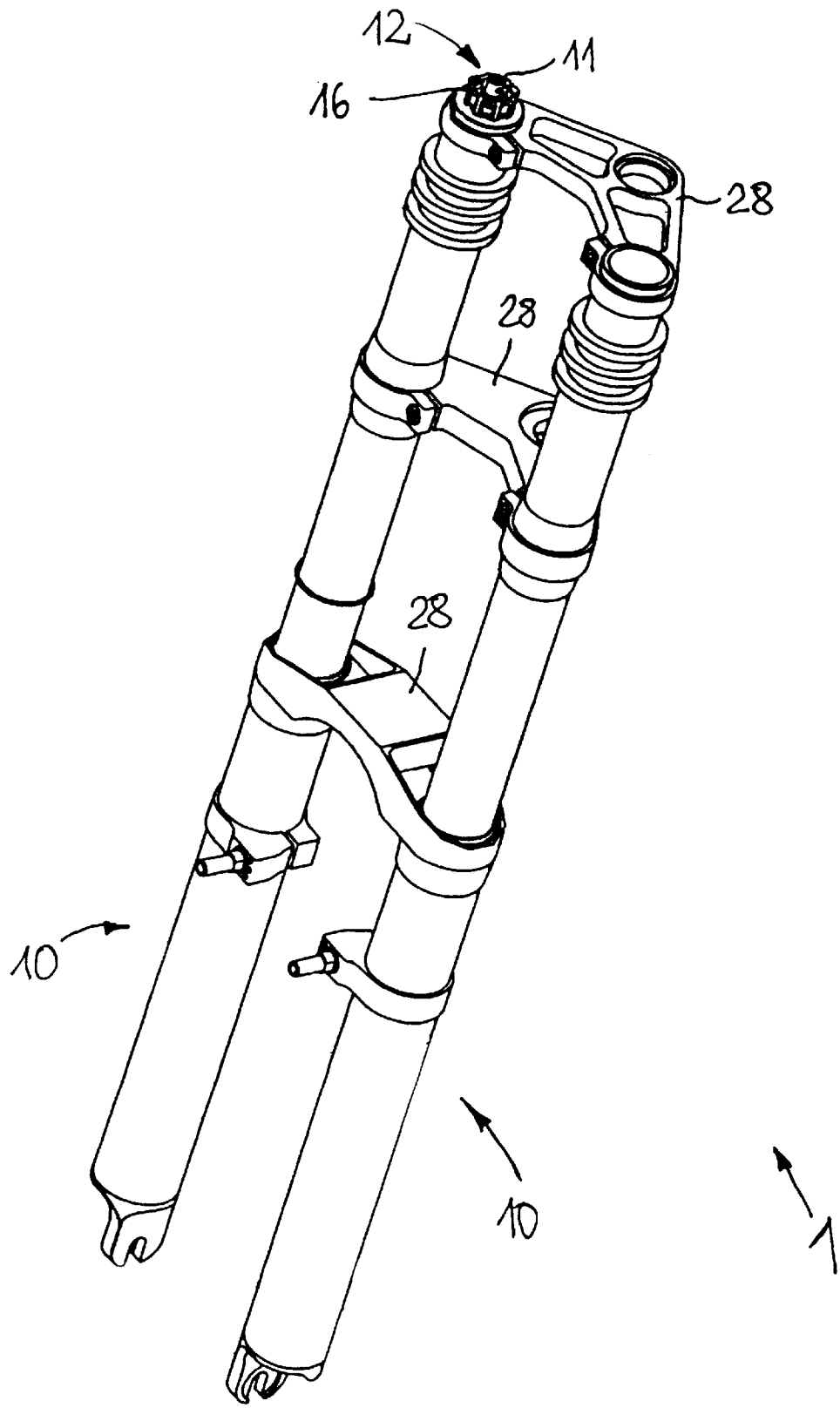
FIG. 1 is a perspective view of a bicycle fork whose fork legs each feature telescope-like telescoping parts nestled within each other and which can be moved in relation to each other.
Figure 2:
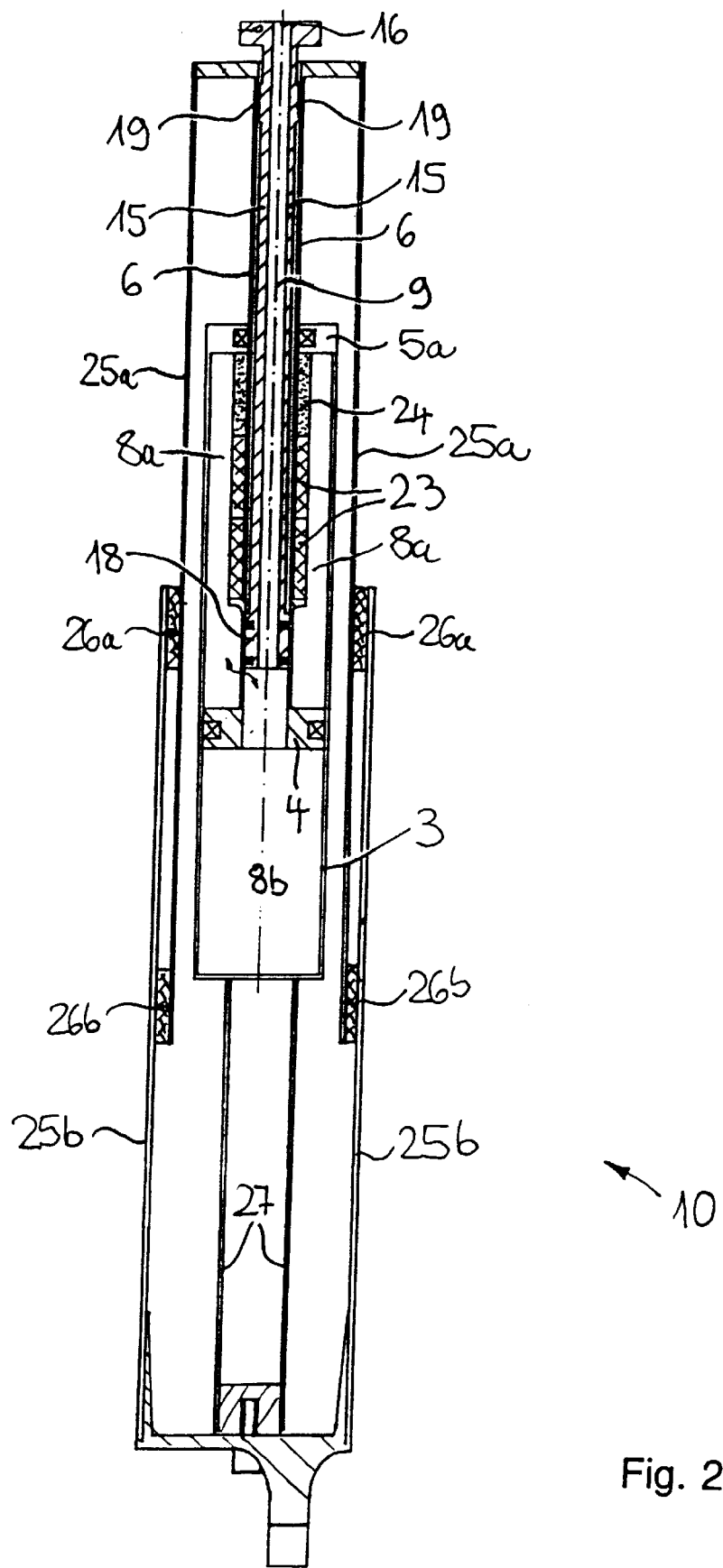
FIG. 2 is a cross-sectional view of the longitudinal mid-plane of a fork leg of the bicycle fork shown in FIG. 1.

In FIGS. 2 and 3, it can be seen that the transfer device 15 features an inner cavity running in the direction of the extension of the transfer device. This inner cavity forms a section of the working gas feed line 9. The inner cavity of the piston rod 6 penetrates the piston 4 approximately in the middle and forms an extension of the feed line 9 connecting with the inner cavity of the transfer device 15. On the end facing away from its operating device 16, the inner cavity of the piston rod 6 empties into the working space 8b of the side of the piston 4 away from the operating device 16.

The hollow piston rod 6 with its inner cavity connected to the working space 8b features an opening on the side 17 for the working gas leading to the other working space 8a. On the inner end of the transfer device 15 facing away from the operating device 16, there is a slide valve 18 provided for closing and opening the opening 17. The slide valve 18 is constructed as a piston inserted airtight into the piston rod 6 and which can be moved in the direction of the arrows Pf1, Pf2 to cover one of the openings on the side 17 airtight in its closed position and pulled out to its open position (FIG. 3). The transfer device 15 is bolted together with the piston rod 6 by means of a threaded connection 19. The positioning of the slide valve 16 relative to the opening 17 is done by turning the operating device 16 located on the outer end of the transfer device 15 around the axis of the threaded connection 19 running parallel to the direction of extension of the transfer device 15. When the slide valve 18 is in open position, the working gas can flow in the direction of the arrow Pf3 from one working space 8a, 8b into the other working space 8a, 8b.

The slide valve 18 features two sealing rings 20 around its circumference, situated opposite each other in the direction of the arrows Pf1, Pf2. These are inserted into radial grooves located on the outer circumference of the slide valve 18. When the slide valve 18 is in closed position, the opening 17 is situated between the sealing rings 17 and therefore sealed from the working space 8b, on one hand, and from the atmosphere outside of the cylinder 3 on the other hand.

As shown in FIG. 3, the walls of the hollow piston rod on the end facing away from the operating device 16 are connected airtight to the piston 4 when the slide piston 18 is in closed position, so that the working spaces 8a, 8b are separated from each other by an airtight seal. On the outer circumference of the piston 4, a sealing ring 21 is provided which seals the piston 4 against the inner wall of the cylinder 3. The sealing ring 21 is inserted into a groove-shaped indentation around the circumference of the piston 4.

FIG. 3 also shows that the cylinder is constructed in a cup shape and is connected with its cylinder wall on one side with the end wall. This provides an especially good seal of the inner cavity of the cylinder 3 from the atmosphere. On the opposite end wall 5a, the inside of the cylinder 3 is sealed from the piston rod 6 by means of the sealing rings 7.

It should also be mentioned that the piston rod 6 features a bundled coil 22 located in the working space 8a on its outer circumference which has two bushings 23 located on the outer circumference of the piston rod 6 and an elastic sleeve 24, which abuts with the inner side of the end wall 5a when in use and is supposed to prevent possible noise during shock absorption. The sleeve 24 may consist, for example, of an elastomer.

The filling of the working space 8a, 8b is carried out while the second shut-off device 14 is open by means of a high pressure pump, e.g. an air pump connected to the working gas feed opening 11 with the feed line 9. When filling with the working gas, the first shut-off device 12 constructed as a valve opens automatically. When the second shut-off device 14 is open, the piston rod is supported on the end wall 5a by the bundled coil 22, the bushings 23 and the elastic sleeve 24, so that the piston 4 is in a predetermined position. After filling the working spaces 8a, 8b with working gas, the second shut-off device 14 is closed so that both working spaces 8a, 8b are sealed airtight from each other.

The fork legs 10 of the suspension device 1 constructed as a bicycle fork each feature telescope-like sleeve-shaped telescoping parts 25a, 25b nestled inside each other that are arranged so that they are movable in relation to each other by means of slide bearings 26a, 26b in the direction of the extension of the fork legs 10. When in use, one of the slide bearings 26a is attached to the lower end of the upper telescoping part 25a on the outside of the circumference of this telescoping part 25a, while the other slide bearing 26b is attached to the upper end of the lower telescoping part 25b on the inner circumference of this telescoping part 25b.

FIG. 2 shows that the reciprocating cylinder device is located in the inner cavity framed by the telescoping parts 25a, 25b nestled within each other. The different telescoping parts 25a, 25b are each closed on the ends facing away from each other by means of a sealing device. When in operation, the upper telescoping part 25a is connected to the end of the piston rod 6 of the reciprocating cylinder device 2 facing away from the piston 4 by its sealing device located on the upper end of this telescoping part 25a. The lower telescoping part 25b is connected to the end wall 5b of the reciprocating cylinder device on it lower end by the sealing device located there and an attached support 27. FIG. 2 shows a mount for the axle of the front wheel on the sealing device located on the lower end of the telescoping part 25b.

Both fork legs 10, which are situated approximately parallel to each other, are connected to each other by bridges 28. Each of the two upper bridges 28 feature two side pieces arranged at an angle to each other, and a punched hole to the swivel-mounted connection of the bicycle fork with the frame of a bicycle is provided near the connecting piece.

In summary, the result is a suspension device 1 including at least one reciprocating cylinder device 2 which features a piston 4 located in the inner cavity of the cylinder 3 and movable along the axis. The cylinder 3 is closed on the ends facing away from each other by end walls 5a, 5b. The piston 4 is connected to a piston rod 6 which penetrates one of the end walls 5a. On both sides of the piston 4 are working spaces 8a, 8b formed by the piston 4 and the end walls 5a, 5b. These working spaces are filled with working gas and sealed airtight when in operation. A filling device is provided for filling the working spaces 8a, 8b with working gas. The filling device features a common feed line 9 for filling both working spaces 8a, 8b. A first shut-off device 12 is located in the feed line 9. The working spaces 8a, 8b on both sides of the piston 4 are connected to each other by a connecting line 13 in which a second shut-off device 14 is located, which can be operated from outside the device.

What is claimed is:

1. Suspension device (1) for a bicycle, comprising at least one reciprocating cylinder device (2), including a piston (4) located in an inner cavity of a cylinder (3) and which is movable along an axis thereof, the cylinder (3) is closed on both ends thereof by end walls (5a, 5b), and the piston (4) is connected to a piston rod (6) which penetrates one of the end walls (5a), working spaces (8a, 8b) are formed on both sides of the piston (4) between the piston (4) and the end walls (5a, 5b), the working spaces are filled with a working gas and are sealed airtight in use, a filling device is connected to the work spaces for filling the working spaces (8a, 8b) with the working gas and includes a common feed line (9) for filling both of the working spaces (8a, 8b) with the working gas, a first shut-off device (12) located in the common feed line (9), and the working spaces (8a, 8b) located on both sides of the piston (4) are connected to each other by a connecting line (13) that is openable and closeable by a second shut-off device (14) that is operable from outside of the device.

2. A suspension device (1) in accordance with claim 1, wherein the connecting line (13) connected between the working spaces (8a, 8b) penetrates the piston (4), and the second shut-off device (14) located in the connecting line (13) is connected to an operating device (16) located on an outer end of the piston rod (6) by a transfer device (15) that penetrates an inner cavity of the piston rod (6).

3. A suspension device (1) in accordance with claim 2, wherein the feed line (9) is at least partially formed by the inner cavity of the piston rod (15).

4. A suspension device (1) in accordance with claim 3, wherein the inner cavity of the piston rod (6) penetrates the piston (4) and forms an extension of the feed line (9) by connecting to the inner cavity of the transfer device (15).

5. A suspension device (1) in accordance with claim 4, wherein the piston rod is connected to the working spaces (8a, 8b) by the inner cavity thereof which includes a side opening (17) for the working gas to move to the other working space (8a, 8b), and a slide valve (18) for closing and opening the side opening (17) is located on an inner end of the transfer device (15).

6. A suspension device (1) in accordance with claim 5, wherein the slide valve (18) is constructed as a piston inserted into the piston rod (6) in an airtight manner, and which can be moved to cover the side opening (17) in a closed position and pulled out in an open position.

7. A suspension device (1) in accordance with claim 6, wherein the cylinder (3) is constructed in a cup shape with one of the end walls (5a, 5b) and the cylinder wall in one piece.

8. A suspension device (1) in accordance with claim 7 formed as a bicycle fork with telescope-like fork legs (11) of the bicycle fork being nestled within each other and featuring telescoping parts (25a, 25b) which can be moved in relation to each other in an extension direction of the fork legs (11), each of the telescoping parts (25a, 25b) forms an inner cavity in which the cylinder device (2) is located, the cylinder (3) of the cylinder device (2) is connected with one of the telescoping parts (25a, 25b) and the piston rod is connected with the other telescoping part (25b, 25a).

9. A suspension device (1) in accordance with claim 8, wherein the piston rod (6) is connected to the upper telescoping part of the fork legs (10) and to an operating device (16) with a feed opening for the feed line (9) located on the upper end of the fork legs (11).

* * * * *